May 11, 1948.  C. E. S. PLACE ET AL  2,441,442
SELF LOCKING STUD
Filed July 26, 1946
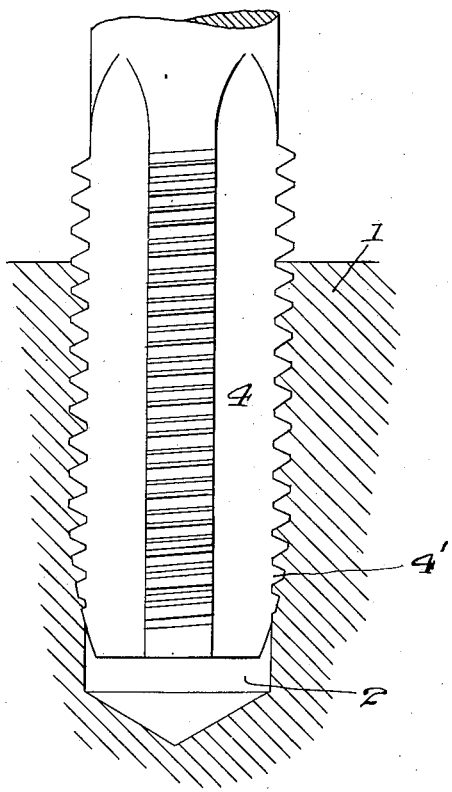
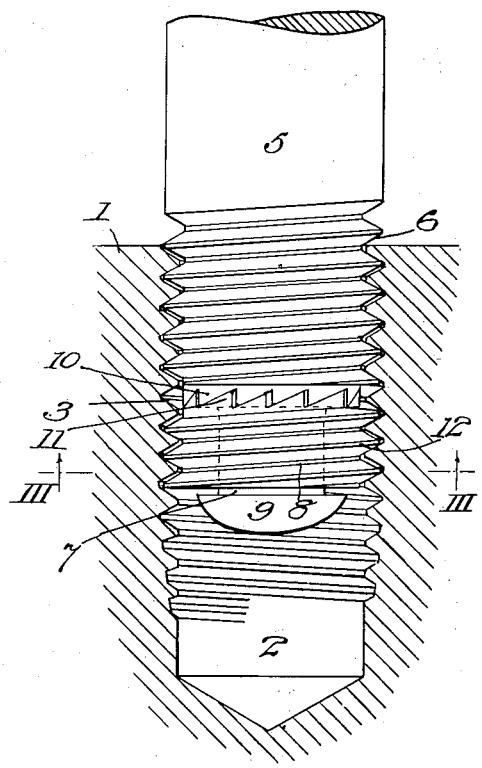
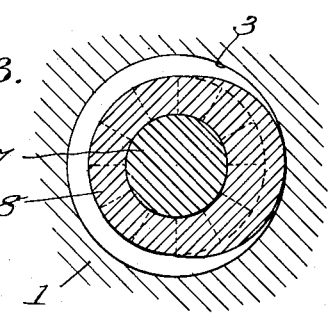
INVENTORS.
Charles E. S. Place
Marshall Van Winkle Jr.
BY Brown & Seward
ATTORNEYS Patented May 11, 1948

2,441,442

UNITED STATES PATENT OFFICE 2,441,442

SELF-LOCKING STUD

Charles E. S. Place, Highland Park, Mich., and Marshall Van Winkle, Jr., Oceanport, N. J.

Application July 26, 1946, Serial No. 686,416

4 Claims. (Cl. 151—32)

This invention relates to a self-locking stud or the like, and particularly to such a stud or machine screw which may be screwed readily into a threaded hole in the work and which will then resist removal as strongly as may be necessary.

An object of the invention is to provide such a stud in which the parts may conveniently be made on available automatic machines.

A further object is to provide such a stud in which the action of the locking part does not prevent the main threads of the stud from carrying their working load on the proper side.

Another object is to provide certain improvements in the form, construction and arrangement of the parts whereby the above named and other objects may effectively be attained.

A practical embodiment of the invention is represented in the accompanying drawings, in which Fig. 1 represents a section of a work-piece, taken axially of a hole drilled therein and showing in side elevation a standard tap with chamfer portion used for tapping threads in said hole;

Fig. 2 represents a corresponding section of the work-piece showing in side elevation the self-locking stud locked in the hole, and Fig. 3 represents a transverse section, taken on the line III—III of Fig. 2, looking in the direction of the arrows.

Referring to the drawings, a work-piece 1 in which a stud is to be set is shown as having a hole 2 drilled or otherwise formed therein. Threads 3 are tapped in the hole 2, preferably by means of a standard tap 4 with a chamfer portion 4' (as distinguished from a bottoming tap) so that the lower threads have decreasing major diameters toward the bottom of the hole.

The stud 5 is provided with holding threads 6 matching and fitting the threads 3 with any convenient degree of closeness. Studs are customarily made with a close class 4 or even class 5 fit, but in the present case such expensive accuracy is not needed, and the fit may be no closer than class 2 or three. At its lower end the stud is reduced in diameter to form a cylindrical neck 7 on which is freely mounted an annular ferrule 8. The neck is upset to form a head 9 which retains the ferrule loosely on the neck. The matching annular end faces of the stud and ferrule are formed with radially disposed complementary clutch or ratchet teeth 10 and 11, respectively, and the ferrule is provided with threads 12, of the same character as the threads 6 on the stud and so disposed as to be in phase with the latter when the teeth 10 and 11 are fully engaged.

The helical angle of the teeth 10 and 11 should be greater than, and in the same direction as, the helical angle of the threads 6 and 12; and the axial motion permitted to the ferrule by the head 9 should be slightly less than the height of said teeth.

In operation, the stud is screwed into the hole with the threads 12 of the ferrule in phase with the threads 6 of the stud; that is, with the teeth 10 and 11 fully engaged. The stud may, if convenient, be screwed in to a point where the threads 12 bind against the lower threads 3 of reduced diameter, or it may be screwed in a lesser distance, as shown in Fig. 2. In either case locking is effected immediately when the stud is turned in the reverse direction, since the frictional engagement of the threads 12 on the ferrule with the threads 3 in the hole (particularly in the lower tapered part, but adequately in the straight part) causes the ferrule to lag behind the stud and thus to be driven strongly downward away from the stud by the wedging action of the clutch teeth 10 and 11. The greater the unscrewing force applied to the stud, the greater will be the downward pressure against the ferrule, while a corresponding increase in the frictional engagement of the threads 12 with the threads 3 continuously prevents the ferrule from turning with the stud.

We contemplate bringing the threads of the stud and those of the hole into such tight frictional engagement that the common fibre insert form of locknut, or other forms having initially a relatively high friction fit, may be applied without freeing the stud.

When thus locked in position the threads 6 on the stud engage with their upper faces against the lower faces of the threads 3 and thus carry the working load on the proper side to assure rigidity and accuracy.

The surfaces of the teeth 10 and 11 are generated by radii perpendicular to the axis of the stud to provide the best distribution of the axial pressure during locking, and the height of said teeth is not only greater than the maximum relative axial motion permitted by the head 9 but is also greater than the maximum amount of axial play found in the loosest practicable fit between the stud and work-piece. Since the locking of the stud results from an artificial and mechanical tightening of the fit, the original tightness or looseness of the fit is unimportant and no care need be taken to meet exacting tolerances in this respect, particularly if the stud is seated at a depth such that the ferrule threads bind against the lower tapered threads of the hole.

Since the neck 7 carries no load but merely keeps the ferrule from falling away from the stud, it may be made as small as desired. A slight bending of the neck, accidentally or otherwise, is not detrimental but may, in fact, aid in assuring the dragging of the ferrule and locking of the stud in a uniformly threaded hole.

It will be understood that various changes may be resorted to in the form, construction and arrangement of the several parts without departing from the spirit and scope of my invention, and hence I do not intend to be limited to the details herein shown and described, except as they may be included in the claims.

What we claim is:

1. A device of the character described comprising, a threaded shank, a neck portion of reduced diameter on the lower end of said shank, and a threaded ferrule freely mounted on said neck portion, the end of the shank and adjacent end of the ferrule being provided with complementary clutch teeth and the threads of the ferrule being in phase with the threads of the shank when said teeth are fully engaged, the helical angle of the clutch teeth being greater than, and in the same direction as, the helical angle of the threads.

2. A device according to claim 1 in which the neck portion is provided with means for limiting the axial motion of the ferrule.

3. A device according to claim 1 in which the neck portion is provided with means for limiting the axial motion of the ferrule to a distance less than the height of the teeth.

4. A device according to claim 1 in which the neck portion is cylindrical and substantially coaxial with the shank, and is provided with a head for limiting the axial motion of the ferrule.

CHARLES E. S. PLACE.
MARSHALL VAN WINKLE, Jr.